March 18, 1941.　　　W. H. FORD　　　2,235,578
MEANS FOR MACHINING CURVED SURFACES
Filed June 4, 1938　　　6 Sheets-Sheet 1
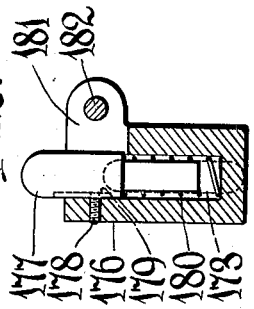
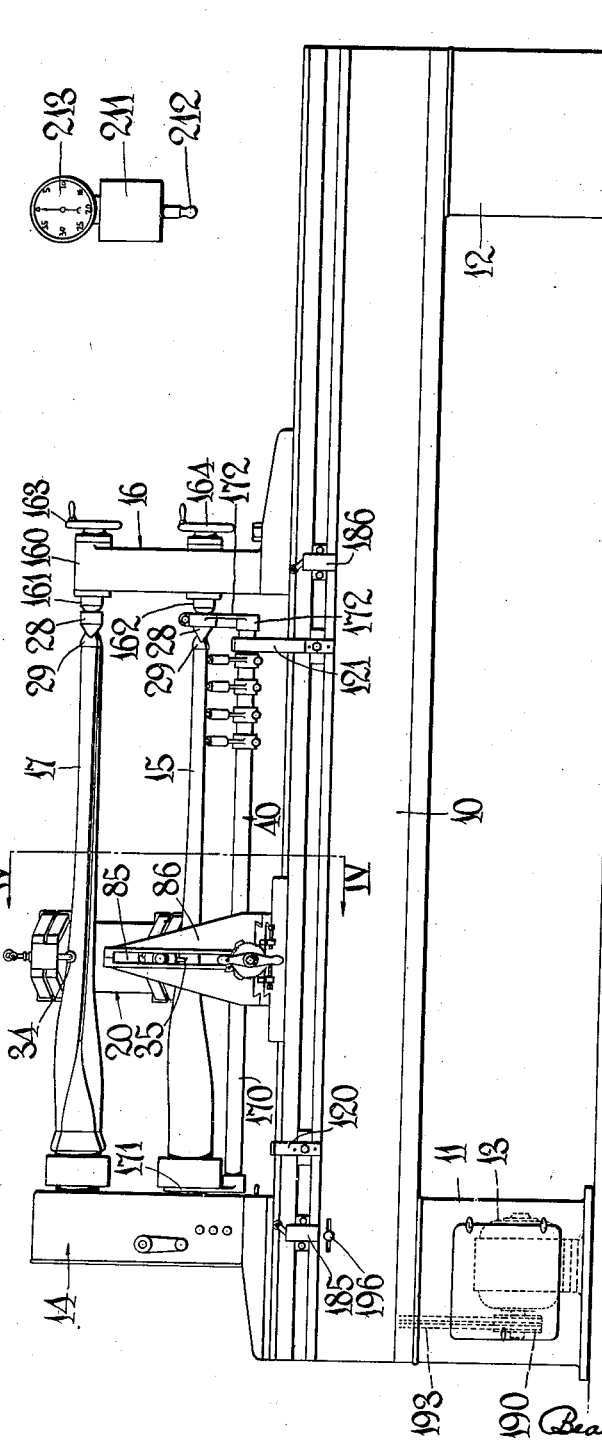
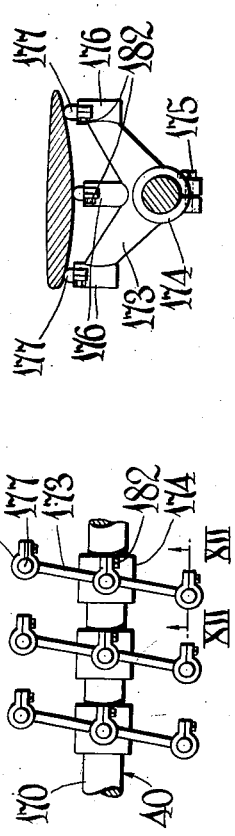
INVENTOR
William H. Ford,
BY
Beau, Brooks, Buckley & Beau
ATTORNEYS March 18, 1941.   W. H. FORD   2,235,578
MEANS FOR MACHINING CURVED SURFACES
Filed June 4, 1938   6 Sheets-Sheet 2
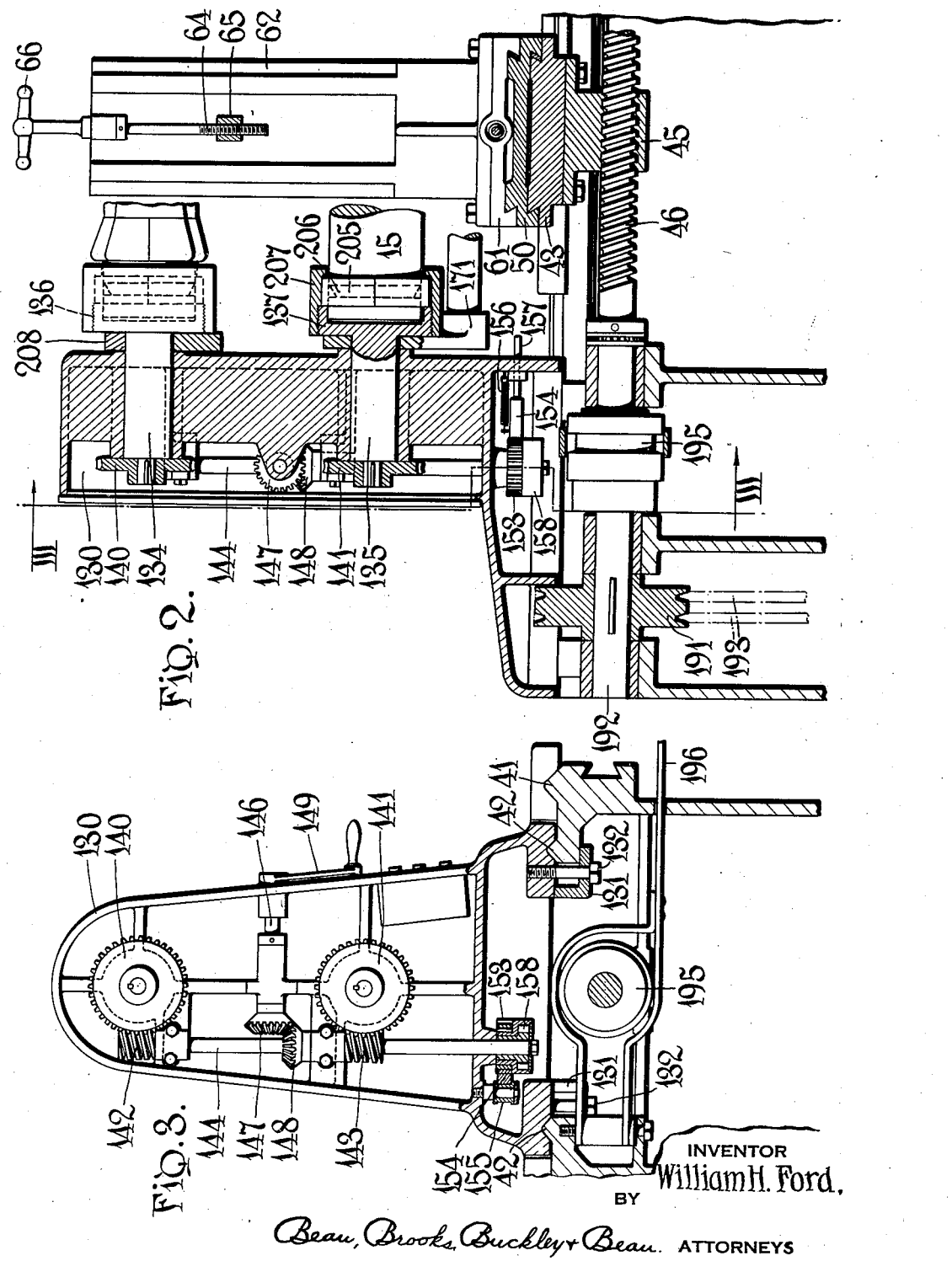
INVENTOR
William H. Ford,
BY
Beau, Brooks, Buckley & Beau. ATTORNEYS March 18, 1941. W. H. FORD 2,235,578
MEANS FOR MACHINING CURVED SURFACES
Filed June 4, 1938 6 Sheets-Sheet 3
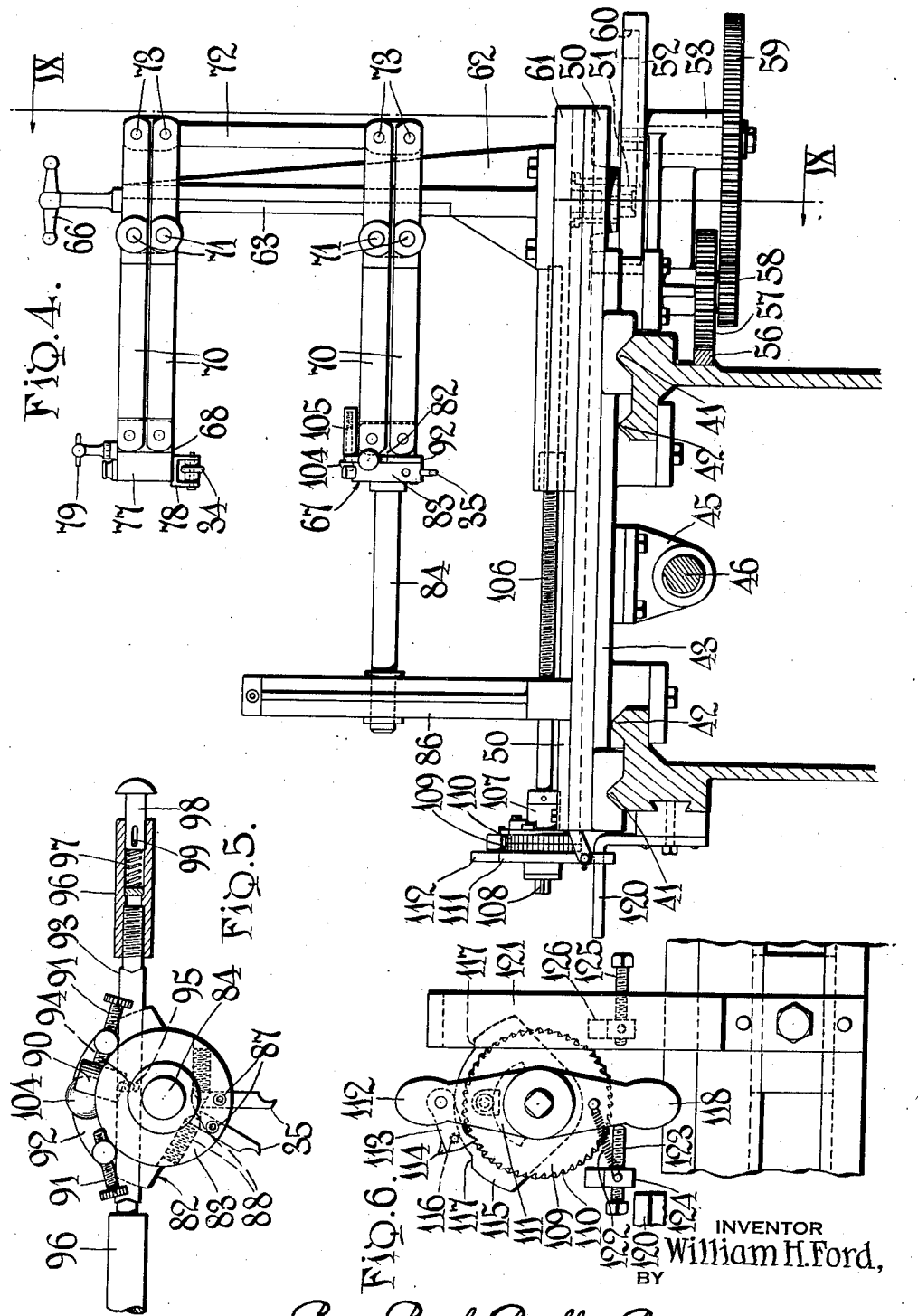
INVENTOR
William H. Ford,
BY
Beau, Brooks, Buckley & Beau. ATTORNEYS

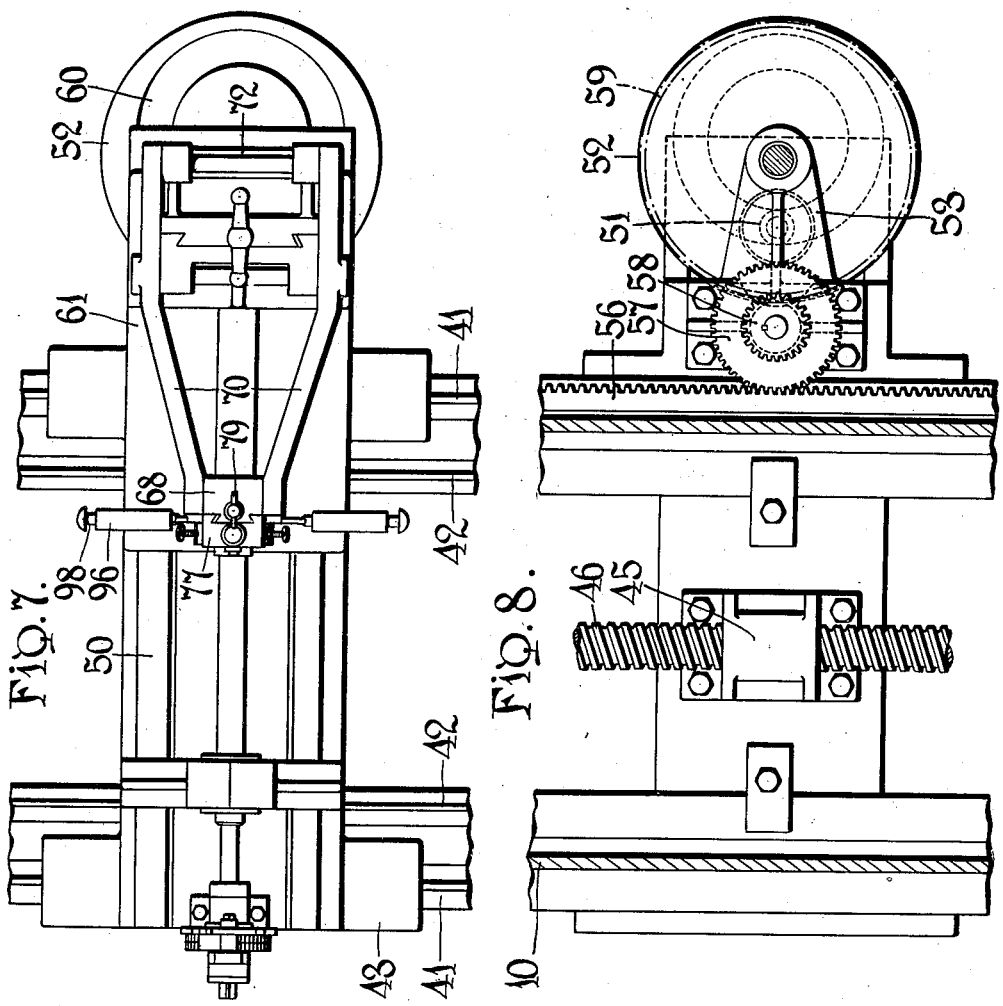
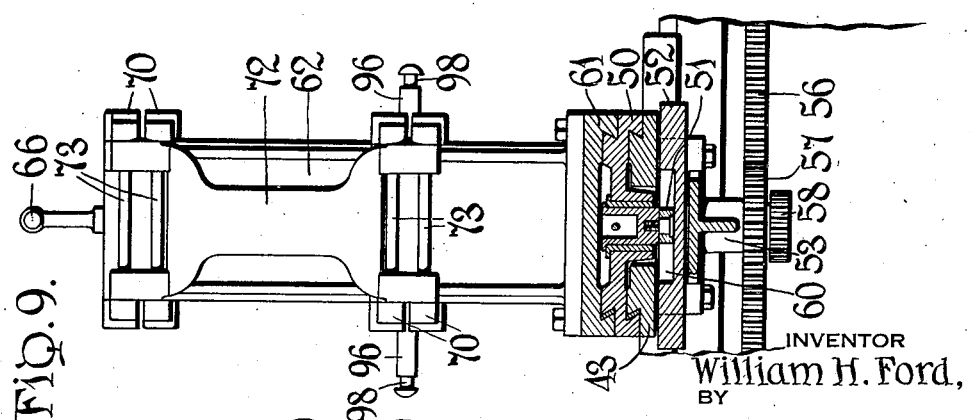

March 18, 1941.  W. H. FORD  2,235,578
MEANS FOR MACHINING CURVED SURFACES
Filed June 4, 1938  6 Sheets-Sheet 5
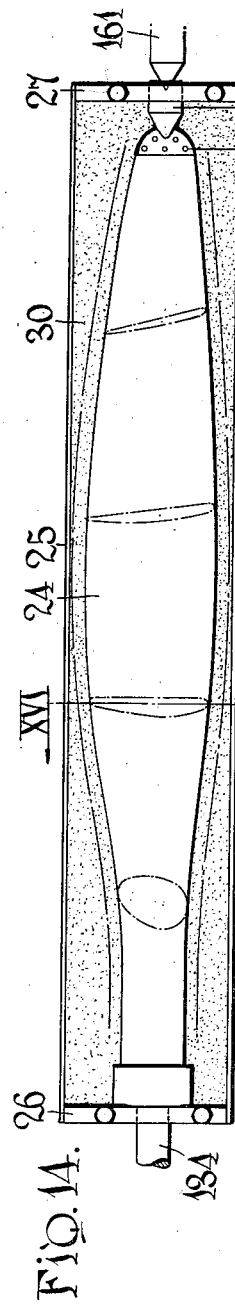
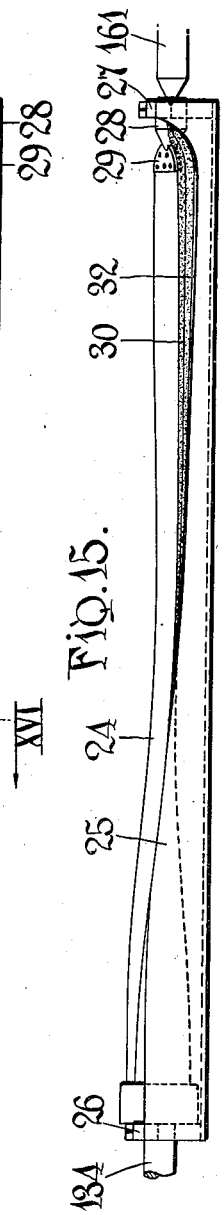
INVENTOR
William H. Ford.
BY
Beau, Brooks, Buckley & Beau. ATTORNEYS March 18, 1941.  W. H. FORD  2,235,578
MEANS FOR MACHINING CURVED SURFACES
Filed June 4, 1938  6 Sheets-Sheet 6
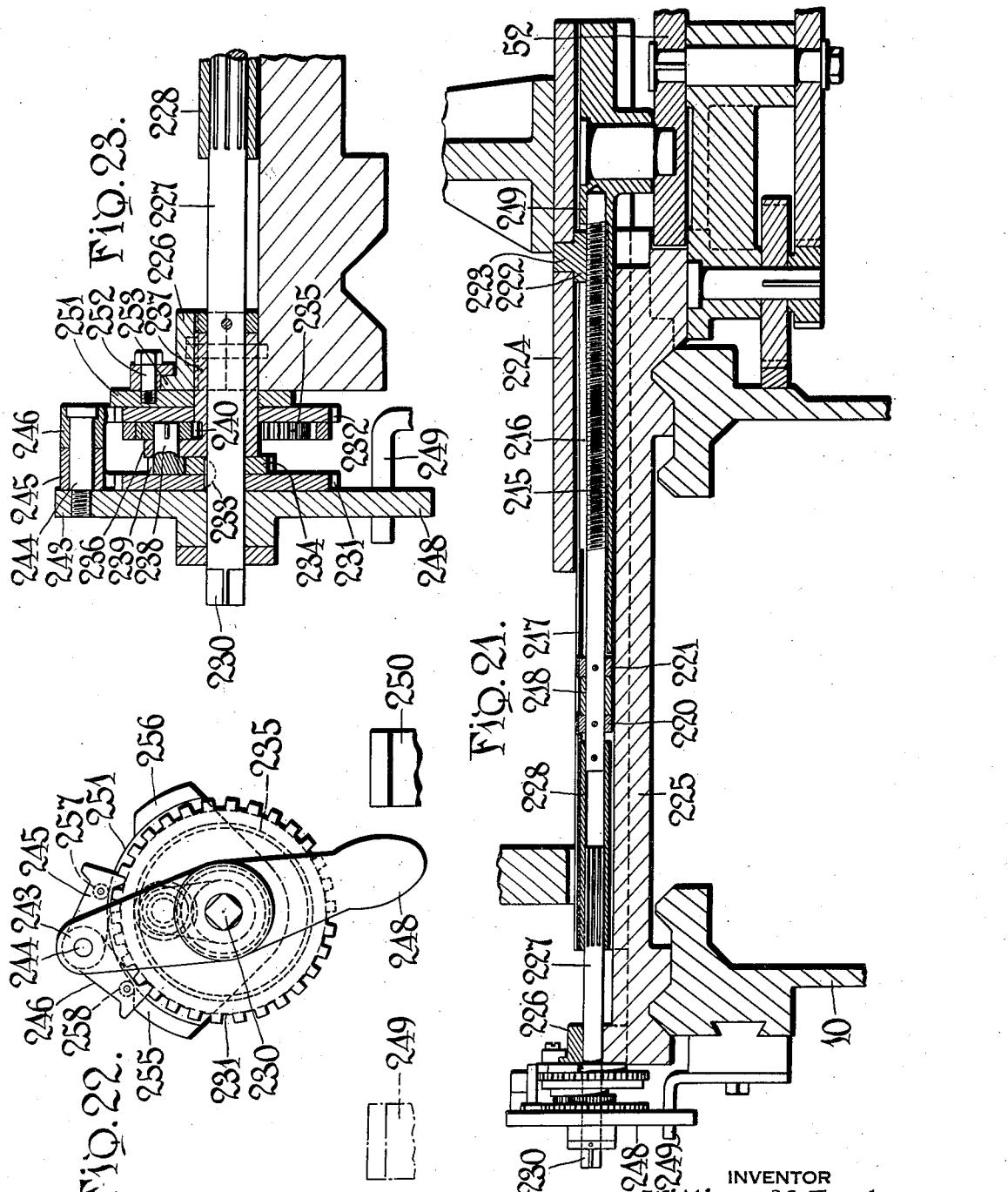
INVENTOR
William H. Ford,
BY
Beau, Brooks, Buckley & Beau. ATTORNEYS Patented Mar. 18, 1941

2,235,578

UNITED STATES PATENT OFFICE 2,235,578

MEANS FOR MACHINING CURVED SURFACES

William H. Ford, Williamsville, N. Y.

Application June 4, 1938, Serial No. 211,874

35 Claims. (Cl. 90—24.3)

This invention relates to a method and means for machining propeller blades and like surfaces.

Many machine tools have heretofore been proposed for surfacing irregular work pieces. These machines are usually of the milling machine type wherein a rapidly rotating cutter is employed. Machines of this general class have been proposed for the specific purpose of finishing propeller blades for airplanes or the like, but up to the present time none of these machines has given satisfaction in practical use.

In prior practices, while machine tools were used to a certain extent to machine propeller blades to match templates at spaced cross sectional points along the length of the blade in size and contour, it was found necessary to accomplish the major portion of the finishing by the use of hand tools or hand guided tools for removing the material between such cross sectional points. This combination of machine and hand work requires the expenditure of approximately a week's time in the finishing of a single blade, while by use of the machine and method of the present invention only a small fraction of that time is required. Such wholly automatic machines as have been proposed have not operated in such manner as to permit their use in actual production.

My present invention is herein shown and described in connection with the surfacing of airplane propeller blades, but it is to be understood that the device of the invention and the method set forth may be employed in other applications and in fact wherever it is desired to impart a smooth machined surface to an analagous irregular or non-planar surface or profile, particularly in metal working or in working with other materials whose nature permits them to be machined in a similar manner. An exemplary form of the machine tool of my invention is illustrated in the accompanying drawings in which:

Fig. 1 is a general side elevational view of the machine;

Fig. 2 is a fragmentary longitudinal vertical cross sectional view taken approximately on the longitudinal center line of the machine and showing the headstock thereof and the support for the cutting mechanism;

Fig. 3 is a transverse cross sectional view taken approximately on the line III—III of Fig. 2 and with the door to the headstock housing removed;

Fig. 4 is a transverse cross sectional view taken on line IV—IV of Fig. 1 and showing the cutting tool and the cutting mechanism therefor in end elevation;

Fig. 5 is a side elevational view on an enlarged scale showing the cutting tool and the holder therefor;

Fig. 6 is a fragmentary elevational view showing the mechanism for automatically feeding the cutting means transversely of the machine;

Fig. 7 is a fragmentary top plan view which shows the cutting mechanism;

Fig. 8 is a fragmentary bottom plan view showing the cutting mechanism with parts of the machine frame in cross section;

Fig. 9 is a fragmentary cross sectional view taken approximately on the line IX—IX of Fig. 4;

Fig. 10 is a fragmentary top plan view showing means for supporting the work piece;

Fig. 11 is an end elevational view of the work supporting means with parts in cross section;

Fig. 12 is an enlarged cross sectional view taken approximately on the line XII—XII of Fig. 10;

Fig. 13 is an elevational view of a dial indicator which may be substituted for the cutting means for inspection, checking and calibration of the finished work;

Fig. 14 is a top plan view of means used in producing a master element for ultimately controlling the cutting mechanism;

Fig. 15 is a side elevational view thereof;

Fig. 16 is a cross sectional view taken approximately on the line XVI—XVI of Fig. 14;

Fig. 17 is a transverse cross sectional view through a master element.

Fig. 18 is a transverse cross sectional view through a finished work piece;

Fig. 19 is a detailed perspective view of that portion of a master element which lies adjacent the inner or hub end thereof;

Fig. 20 is a transverse cross sectional view through a master element adjacent the inner or hub end thereof;

Fig. 21 is a fragmentary cross sectional view similar to Fig. 4 but illustrating several modifications of the transverse feed mechanism;

Fig. 22 is a fragmentary front elevation of the automatic transverse feed mechanism of Fig. 21, and Fig. 23 is a vertical cross sectional view through the mechanism of Fig. 22.

In comparing the machine of my present invention with machine tools of conventional form, it might be said that the manner in which the cut is taken in my new machine is, to some extent, analagous to the operation of a shaper in that there is provided a tool which reciprocates across or along the surface of a work piece which is stationary so far as the direction of reciprocation of the tool is concerned. In my new machine, however, I contemplate cutting in both directions of movement of the cutting tool, there being no idle return stroke. The tool itself is so supported that it may be moved transversely of its direction of reciprocation for either automatically or manually feeding the tool across the surface of the work in either direction, preferably by giving the tool a slight transverse movement at the beginning or conclusion of each longitudinal reciprocation.

Means are further provided in the preferred form of my invention for rotating the work piece, preferably on an axis parallel with the direction of reciprocation of the cutting tool, so as to present the surface of the work at substantially right angles to the direction of pressure of the tool.

The machine illustrated in the drawings as a preferred embodiment comprises a base member 10 supported on pedestals 11 and 12, the former of which may enclose an electric driving motor 13. Referring generally to Fig. 1 the numeral 14 designates a headstock supported upon the base 10 and which supports one end of the work piece 15 which is shown in the form of one blade of an airplane propeller. The numeral 16 designates a tailstock which is adjustable longitudinally upon the base 10 and which supports the opposite end of the work piece 15. There is further provided in association with the head- and tailstocks 14 and 16 respectively, means for supporting a master element 17 in a manner similar to the manner in which the work piece 15 is supported, and in the illustrated instance the master element is disposed parallel with and above the work piece 15. A cutting mechanism designated generally at 20 is provided and the cutting mechanism is adapted to reciprocate along the bed 10 in such manner as to operate along the entire length of the work piece 15.

The first step in proceeding according to the principles of my invention is to produce the master element 17. To accomplish this end I preferably employ an elongate box-like member 25. The upper portions 26 and 27 of the ends of the box-like member 25 are removable and normally held in position by screws or the like. I dispose an actual propeller blade 24, which I desire to duplicate, in the box with the inner shaft end thereof supported at one end of the box in a manner which will later be described and with the tip end of the blade supported by a block 28 disposed in an opening provided in the opposite end of the box. The block 28 carries a pocket or cup member 29 which receives and supports the tip of the propeller blade. The supporting means for the shaft end of the propeller blade and the tip supporting block 28 are secured in position in the ends of the box member 25 by means of the removable portions 26 and 27 respectively, and the blade is so positioned that its flat sides extend substantially horizontally.

The box member 25 is then filled with a moldable material, which may be plaster of Paris or plastic wood, to a varying level depending on the conformation of the propeller blade. This level is such that, as illustrated in Fig. 16, the upper surface of the plastic material is at all points disposed just a slight distance below the most extreme lateral projection of the edge of the propeller blade. As shown in Fig. 16, wherein the plastic material is designated by the numeral 30, a filler block or blocks 31 may be employed so that a less amount in volume of plastic material is required. The block or blocks 31 may vary in height along their length owing to the greater distance from the bottom of the propeller blade to the bottom of the box at the tip end thereof than at the hub or shaft end. Also the sides of the box may preferably be cut down to a lower height at the tip end of the propeller blade as shown at 32 so that the edge 32 is more or less in line with the level of the plastic material at substantially all points.

With the sample or model propeller blade 24 thus positioned and supported in the box 25, I proceed with partial preparation of a master element which is ultimately to be used in actually controlling and guiding the cutting mechanism in the production of duplicates of the sample or model blade. For the production of such master the assembled box and propeller blade sample are disposed in the upper position between the head- and tailstocks, which position is occupied by the master element 17 in the illustration of Fig. 1, and I dispose a blank in the position occupied in Fig. 1 by the work piece 15. The cutting mechanism 20 of the machine is provided with a follower roller 34 and a cutting tool or cutting tools 35 which are arranged for joint longitudinal reciprocation by instrumentalities which will later be described.

The cutting tool 35 raises and lowers and moves transversely and longitudinally directly with any such corresponding movements of the follower roller 34. It will therefore be seen that as the entire cutting mechanism 20 reciprocates back and forth with the follower roller resting upon the upper surface of the sample or model propeller blade 24 an exactly corresponding contour will be cut or formed upon the upper surface of the master element 17. Referring to Fig. 17 the upper surfaces of the fins 36 and 37 occupy a position determined by the upper level of the plastic material 30 in the box.

When the upper surface of the master blank has been so treated on one side, the box member 25 is removed from the machine and the sample or model propeller blade 24 is taken out of the box, the plastic material is removed, and the sample blade 24 is re-positioned in the box with its other surface uppermost. The box 25 and the propeller blade 24 contained therein are then again positioned between the upper portions of the head- and tailstocks 14 and 16, respectively, of the machine and the master blank is given half a revolution in its position between the lower portions of the head- and tailstock so that its hitherto uncut side is in position to be formed. The box is then again filled with plastic material and the upper surface of the plastic material is here also arranged to be a short distance below the points of greatest transverse dimension of the sample blade.

The follower member 34 is then lowered with respect to the cutting mechanism generally or, optionally, the cutting tool or cutting head may be raised with respect to the remainder of the cutting mechanism. This is done so that the resultant master 17 will be produced with the fins 36 and 37 extending along opposite edges of the master. It will be noted that the vertical distance which the follower is lowered or which the tool is raised must be equal to the vertical thickness of one of the fins 36, 37 plus twice the distance from the point of greatest transverse dimension of the sample blade down to the level of the plastic material 30 and it will further be observed that while the upper and lower surfaces of the master element 17 are exact duplicates in every respect of the upper and lower surfaces of the sample or model propeller blade 24, the master element is at all points thicker than the sample or model blade by exactly the distance which the cutting tool 35 was raised or the follower roller 34 was lowered.

Referring still only generally to the mode of operation of the new machine and method to begin to produce a series of finished propeller blades of the same shape and form as the actual propeller blade 24, the master element 17 is then disposed in the position which it occupies between the head- and tailstock in Fig. 1 and a usually cast or otherwise roughly pre-formed work piece is likewise positioned between the head- and tailstock as designated at 15 in Fig. 1. Suitable vertical adjustment of either the cutting head or follower roller 34 is then made to compensate for the presence of the fins 36 and 37 of the master element and for its greater thickness than the desired finished thickness of the work piece 15.

Means are provided for supporting the work piece along its length and such supporting or steadying means are designated generally at 40. With the supporting means 40 in operative position the cutting tool is caused to reciprocate across the upper surface of the work piece until the work piece is substantially completely traversed by the cutting tool and the upper surface of the work piece is a duplicate of the upper surface of the master element 17. The master element and the work piece are then rotated so that the opposite side of the work piece may be finished in a manner similar to that described for the first surface, again first making suitable vertical adjustment of the follower roller so that the finished thickness of the work piece or propeller blade 15 will be correct.

Referring more in detail to the preferred construction of my new machine, the base member or bed 10 is provided along its upper surface with a pair of ways 41 and a second pair inwardly thereof designated 42. The cutting mechanism 20 is provided with a carriage 43 which rests upon and is guided for longitudinal movement by the ways 41. Longitudinal reciprocation of the carriage 43 and consequently of the entire cutting mechanism 20 is brought about by means of a bracket 45 which is fixed to the underside of the carriage between the ways and is internally threaded to engage a transmission screw 46. The transmission screw 46 is alternately rotated in opposite directions to move the carriage longitudinally in a manner which will hereinafter be described.

It is desired to operate upon the surface of the work piece, when such work piece is an airplane propeller blade, in such manner that a full cutting stroke may be made along the length of the blade. To this end means are provided for automatically moving the cutting mechanism transversely of the machine during each stroke in such manner that at the beginning of a stroke the cutting tool will engage the propeller blade adjacent its relatively narrow tip portion and will automatically move transversely so that its longitudinal path of movement is not in a straight line, but follows generally the curved contour of the edge of the propeller blade. In other words the cutting mechanism moves from left to right, as seen in Fig. 4, during the first half of each cutting stroke and then back again during the remaining half of the cutting stroke to a transverse position substantially the same as its starting position. In this manner curving cuts are taken across the face of the propeller blade until all of the upper surface of the blade to one side of the center line has been surfaced. The curvature of the path of the cutting tool is then reversed and cutting is commenced at the opposite edge of the then uppermost surface being finished and the curving cuts will continue with gradual feeding of the tool inwardly toward the center line of the work until the entire surface has been treated.

The means for effecting this curvature of path of the cutting tool includes a slide member 50 which is disposed upon the carriage 43 and secured thereto for transverse sliding movement by means of the complementary dovetails provided upon the upper surface of the carriage and under side of the slide member 50. Referring particularly to Figs. 4 and 9, the slide member 50 is provided adjacent one end with a cam roller 51 which is adapted to engage with a face cam 52. The cam 52 is carried by a bracket bearing 53 which is in turn supported by the carriage 43. A rack bar 56 is secured against the bed 10 of the machine and extends longitudinally thereof in such manner as to be engaged by a longitudinally moving pinion 57, also carried by the bracket bearing 53 of the carriage 43, which pinion in turn, through the gears 58 and 59, causes rotation of the cam 52 in opposite directions in accordance with and in synchronism with the opposite reciprocations of the carriage 43 on the bed 10. The groove 60 in the cam 52 is so formed that the curvature of the path of the cutting mechanism in its reciprocations will closely simulate the curvature of the edges of the work piece or the finished blade. It is to be understood that after half of one surface of the blade has been finished in the manner described above the cam may be replaced by another cam for producing an opposite curve in order that the other half of that surface of the blade may be treated with the curvature of the path of the cutting tool opposite to what it was during the first half of this finishing step. In the event the curves at the leading and trailing edges of the propeller blade are the same or nearly the same the cam, instead of being replaced, may merely be re-positioned by turning it through 180°.

The remainder of the cutting mechanism 20 which is disposed above the slide 50 is also mounted for transverse sliding movement upon the slide 50 and provision is made for feeding this upper structure transversely for feeding the tool into the work between successive cuts. To this end an upper slide 61 is formed to rest upon the slide member 50 and the under side of the upper slide 61 and the upper side of the slide 50 are provided with dovetailed sliding keys which retain the upper slide 61 upon the slide 50 but permit transverse sliding movement of the upper slide 61 upon the slide 50.

The upper slide 61 carries supporting means 62 for the cutting head and the follower for the master element, and suitable linkage mechanism for causing the cutting head and the follower member to retain a vertical disposition throughout their various movements and for causing both of those members to move in unison at all times. For preliminary vertical adjustment a vertically slidable member 63 is associated with the supporting element 62 by means of a conventional dovetail connection and vertical movements of the slidable element 63 are controlled by means of a screw 64, journaled in the supporting member 62 and engaging an internally threaded block 65 carried by the vertically slidable member 63 as is best shown in Fig. 2. A lever or hand wheel 66 is provided for manipulation of the screw 64.

The cutting head is designated generally as 67 in Fig. 4 and the supporting means for the follower roller 34 is designated 68. Both the holder 68 for the follower roller and the cutting head 67 are pivotally engaged on opposite sides to spaced parallel levers 70 which have their fulcrum upon the supporting means 63 as at 71. Vertically extending links 72 have pairs of pivot points at their opposite ends for pivotally engaging rearward extensions of the levers 70 as at 73 in Fig. 4. It will be clear from the foregoing that the parallel linkage mechanism just described will constrain movement of the cutting head 67 to movement directly with movement of the follower roller 34 and that the linkage mechanism maintains vertical alinement of the cutting head 67 and the follower roller support 68 regardless of the extent or direction of their movements about the pivot points 71.

The supporting means 68 for the follower roller 34 has a vertically slidable portion 77 which directly carries the roller 34 by means of a yoke 78 for permitting the roller 34 to rotate freely in a longitudinal direction with respect to the machine generally. The vertically slidable portion 77 may be adjusted vertically independently of the remainder of the linkage mechanism by manipulation of handle means 79 which controls operation of a screw (not shown) which is journaled in the supporting block 68, Fig. 7, and has threaded engagement with the vertically slidable portion 77 of the supporting means for the follower roller 34.

The cutting tool supporting head, designated generally 67, is shown in detail in Figs. 4 and 5. The cutter supporting head consists of a block 82 which directly engages two pairs of levers 70 and an element 83 which is journaled in the block 82 for pivotal movement about a horizontal axis extending transversely of the machine by means of a pivot shaft 84. The pivot shaft 84 extends forwardly of the element 83 and into a vertical slot 85, provided in a bracket member 86 which is rigidly positioned upon the slide member 50. This construction gives rigid support to the cutting head 67 against horizontal deflection.

The pivotal element 83 is provided with a pair of cutting tools 35 secured therein by set screws 87 and adjustable by manipulation of screws 88. Means for limiting the pivotal movement of the element 83 comprise a stop pin 90 rigidly associated with the pivotal element and a pair of screws 91 carried by an enlargement 92 formed upon the relatively stationary block 82 of the cutting head 67 and adapted to be engaged by the pin 90. A horizontal slidable bar 93 is also seated in the face of the enlargement 92 and may be held therein by the pivotal element 83. The bar 93 carries a pin 94 which engages in a vertically extending slot 95 in the pivotal element 83. Each end of the bar 93 is provided with cushioning means comprising a hollow sleeve 96 rigidly associated with the bar 93, a coil spring 97 therein and a headed stud 98 which has limited sliding movement in the sleeve member 96 by reason of a pin and slot connection 99.

In the position illustrated in Fig. 5 the right hand cutting tool 35 is in operative position and the cutting head will be moving from left to right. As the end of the stroke is reached the headed member 98 comes into engagement with the tailstock of the machine, and the bar member 93 with the pin 94 is moved from right to left relative to the cutting head, carrying with it the pivotal tool carrying member 83 until the pin 90 comes into engagement with the left hand stop screw 91, whereupon the left hand cutting tool 35 is in operative position preparatory to a cutting stroke from right to left as seen in Fig. 5.

To insure retention of the pivotal member 83 in either of its extreme positions a detent is provided which consists of a pin having a rounded head 104 and projecting into a sleeve 105 carried by the relatively stationary enlargement 92. Suitable spring means not shown are disposed in the sleeve 105 for urging the pin with its rounded head portion 104 outwardly and partially into the path of the stop pin 90. The enlargement 92 of the block 82 may be recessed a sufficient distance to admit the rounded head 104 as it is moved inwardly by passage of stop pin 90.

For originally positioning the cutting mechanism laterally with respect to the work, and for either manually or automatically feeding the cutting mechanism laterally or transversely, the upper slide 61 is moved upon the slide member 50. Such movement is effected by means of a screw 106, Fig. 4, which is journaled in a bearing block 107, fixed upon and carried by the slide member 50. The threaded end of the screw 106 has engagement with an internally threaded portion of the upper slide member 61 so that rotation thereof will cause transverse movement of the upper slide 61 with respect to the slide member 50. Such rotation may be effected manually by use of a wrench or handle member in engagement with the squared end 108 of the screw or automatically by means of the mechanism illustrated in detail in Figs. 4 and 6.

This mechanism comprises a pair of ratchet wheels 109 and 110, having their teeth oppositely disposed. Both ratchet wheels are fixed for rotation with the screw 106. A lever 111 is pivotally mounted upon the screw 106 and has an upwardly extending arm 112 which pivotally supports a pair of pawl members 113 and 114 which may selectively be brought into cooperation with the ratchet wheels 109 and 110 respectively. In Fig. 6 the pawl 113 is in operative relationship with respect to the ratchet wheel 109. By moving both pawls about their pivotal connection the pawl 114 may be brought into operative relationship with the ratchet wheel 110, the pawl 113 being at the same time taken out of engagement with the ratchet wheel 109.

To prevent excessive movement of the ratchet wheels by the lever and pawl assembly a stationary cam plate 115 is provided and a pin or roller 116 extends through both pawl members and rests upon the cam plate 115. Rises 117 at opposite sides of the cam plate 115 are adapted to lift the pawl members from operative engagement with the ratchet wheels whenever movement of the lever 111 exceeds a pre-determined amount.

Operation of the lever 111 results from alternate engagement of the upwardly extending arm portion 112 and a depending arm portion 118 with relatively stationary abutment means 120 and 121 which are adjustably secured to the bed 10 of the machine. The lever 111 is normally held in a substantially vertical position by means of a spring 122 which, as illustrated in Fig. 6, urges the depending portion 118 of the lever into engagement with an adjustable stop screw 123, carried by a block 124 which is in turn carried by the lower slide 50. The spring 122 engages at one of its ends the lower portion of the lever 111 and at its other end a pin on the block 124. A similar stop screw 125 and supporting block 126, also carried by the slide member 50, are provided for a purpose which will hereinafter appear.

Operation of the automatic transverse feed mechanism with the instrumentalities in the positions shown in Figs. 1, 4 and 6 thereof will be as follows. As the cutting mechanism reaches its extreme left hand position, as seen in Fig. 1, the lower extension 118 of the lever 111 strikes the stop or abutment member 120, causing the lever 111 to move in a counter-clockwise direction, which results in feeding the cutting mechanism a predetermined increment from left to right, as seen in Fig. 4. As retrograde movement of the cutting mechanism begins the spring 122 returns the lever 111 to its normal vertical position in abutment with the stop screw 123. As the cutting mechanism reaches its right hand limit of movement, as seen in Fig. 1, the upper extension 112 of the lever 111 strikes the stop or abutment member 121 of Fig. 1, causing another and equal counter-clockwise rotation of the ratchet wheels and the screw 106, resulting in further transverse feeding from left to right, as seen in Fig. 4.

For feeding the cutting mechanism in an opposite transverse direction, that is, from right to left, as seen in Fig. 4, the pawls 113 and 114 are swung about their pivots so that the pawl 114 is brought into engagement with the ratchet wheel 110. The point of anchorage of the spring 122 on the block 124 is then changed so that the spring extends between the lever 111 and the block 126, and the stop screw 125 is brought into abutment with the lever 111 and the stop screw 123 is withdrawn. The abutment members 120 and 121 on the bed 10 of the press are then interchanged or they may be made vertically adjustable so that the member 120 may be raised to the position of member 121 and member 121 lowered to the position of member 120.

With these adjustments made it will be clear that longitudinal reciprocation of the cutting mechanism will be accompanied by step by step clockwise rotation of the screw 106 and consequent transverse feeding of the slide member 61 and the cutting mechanism generally in a direction from right to left, as seen in Fig. 4.

For maximum efficiency it is desirable that the cutting tool be at all times as nearly as possible in a longitudinal plane perpendicular to the work surface, and to this end I provide means for rotating synchronously both the work piece 15 and the master element 17 about their longitudinal axes. This ability to rotate the work piece and the master element upon their longitudinal axes is of particular advantage when operating upon or close to the edge portions of a propeller blade. Synchronous rotation of the work piece and the master element may be effected either manually or automatically and the mechanism for producing such rotation is in the present instance contained in headstock designated generally as 14 in Fig. 1 and illustrated in detail in Figs. 2 and 3.

The headstock assembly includes a housing element 130 which is supported upon the bed 10 of the machine and held thereagainst by means of clamping members 131 and screws 132. The lower portion of the housing engages the inner pair of ways 42 and may therefore be adjusted longitudinally of the machine if desired.

A master element supporting spindle and a work supporting spindle designated 134 and 135, respectively, are journaled in the housing 130 and terminate outwardly in threaded enlargements 136 and 137, respectively, for engaging means for supporting the master element and the work piece. At their inner ends the spindles 134 and 135 have fixed thereto worm wheels 140 and 141 which are adapted to be actuated by worms 142 and 143, respectively, the worms being secured to a common vertically extending shaft 144 which is supported within the housing by suitable bearings associated therewith. For manually causing rotation of the spindles 134 and 135, there is provided a stub shaft 146 which is journaled in the housing element 130 and has driving engagement with the shaft 144 by means of a pair of beveled gears 147 and 148. The stub shaft 146 terminates at the outside of the housing 130 in a manipulating handle 149.

For automatically causing a step by step rotation of the work piece and master element suitable mechanism is provided at the lower end of the worm shaft 144. This mechanism includes a pinion 153 supported by the shaft 144 and a driving rack 154. The rack 154 is mounted for longitudinal sliding movement and is preferably held against the pinion by means of a backing roller 155. A spring element 156 tends to keep the rack in its extreme position to the right, as seen in Fig. 2, and the rack member terminates in a portion 157 which projects through the headstock housing 130, as seen in Fig. 2.

The projection 157 is so disposed as to be in the path of some part of the cutting mechanism as it moves from right to left and approaches its left hand extremity of movement as seen in Fig. 2. A one way clutch 158 of conventional form is provided so that only the actuations of the rack bar 154 from right to left, as seen in Fig. 2, are transmitted to the worm shaft 144, the return stroke under the impetus of the spring 156 being idle.

The outer or tip end of the propeller blade and of the master element are supported by means associated with the tailstock designated generally at 16 in Fig. 1. The tailstock comprises a housing 160 having disposed therein a pair of spindles 161 and 162 in axial alinement with the spindles 134 and 135, respectively, of the headstock. The spindles 161 and 162 are arranged to be adjusted axially by manipulation of the hand wheels 163 and 164, respectively. The screw mechanism for carrying out such axial adjustment is disposed within the housing 160, is of conventional construction found in lathe tailstocks and the like, and is not shown in detail.

To facilitate rotative engagement of the work piece 15 and the master element 17 with the spindles 162 and 161, I employ the block 28, hereinbefore referred to, which has rigidly associated therewith a tip supporting pocket 29 and in its opposite face a centering opening for engagement with the tapered points of the tailstock spindles 161 and 162. The tailstock housing 160 is disposed on the inner pair of ways 42 in a manner similar to the headstock and it may likewise be adjusted longitudinally along the bed of the machine.

It is desirable to provide intermediate support for the work piece 15 to insure greater rigidity, and consequently greater accuracy of the finished product. To this end the supporting mechanism, indicated generally at 40 in Fig. 1, is provided and comprises a longitudinally extending shaft or bar 170 which extends beneath the work piece and is firmly supported by arms 171 and 172 which are suspended from the propeller supporting means of the head- and tailstocks respectively.

Associated with the shaft or bar 170 are a number of brackets 173 which are axially and radially adjustable on the bar 170 through the bearing connection 174. Adjusted position of the brackets with respect to the bar 170 is maintained through split formation of the bearing connection 174 and the provision of a locking screw 175. Each bracket 173 is provided with a number of upwardly projecting arms terminating in hub or boss members 176, each of which has an axial opening for receiving a stud 177 which is retained in the opening and permitted to have limited axial movement by reason of a screw 178 which enters a medial groove 179 formed in the stud 177. A spring 180 back of each stud 177 urges the stud to its outward limit of movement. The upper ends of the hubs 176 are split as at 181 and locking screws 182 are provided for locking each stud in adjusted position.

In arranging the intermediate supporting means for use, as many bracket members 173 may be employed as are desirable or found necessary. The brackets are arranged beneath the work piece with all of the locking screws 182 loosened, whereupon each stud 177 will, under the impetus of its spring 180, engage yieldably against the bottom of the work piece as best shown in Fig. 11. The locking screw 175, for locking the bracket member to the shaft or bar 170, and the locking screws 182, for locking the studs against axial movement in the opening in each hub 176, are then tightened and the mechanism will give firm support to the work piece while it is being operated upon.

It will be noted that, owing to the manner in which the bar 170 is suspended from the head- and tailstock spindles and the fact that the arms 171 and 172 are rigidly fixed for rotation with the work piece, the intermediate supporting mechanism will maintain a constant relation with respect to the work piece, even while the work piece is being rotated about its longitudinal axis.

A similar supporting mechanism may be employed for supporting the master element in the upper position between the head- and tailstocks, but such intermediate support is not believed to be necessary there excepting perhaps in connection with the relatively weaker assembly of the box 25 and the model or sample propeller blade 24 which is embedded therein.

The driving motor 13 is of the reversible type and reversing switches 185 and 186 of conventional design are adjustably disposed along the bed 10 of the machine in such position that they will be engaged by the carriage 43 in its longitudinal travel along the bed 10. The adjusting switches are adjusted longitudinally along the bed 10 to such position that they will be engaged by the carriage 43 at whatever point it is desired to end the travel of the machine in one direction and begin retrograde movement.

Drive from the motor to the transmission screw 46 may be through pulleys 190 and 191 disposed respectively on the motor shaft and on a stub shaft 192 disposed co-axially with the transmission screw 46. One or more belts 193 may be employed. A manually operable clutch 195 is disposed between the stub shaft 192 and the transmission screw 46 for selectively controlling rotation of the transmission screw 46, and a control handle 196 for the clutch appears in Figs. 1 and 3. The clutch 195 may be of any suitable conventional form, a friction clutch being preferable.

As will be seen from an inspection of Figs. 14 and 15, the inner portion of a propeller blade, and consequently of the master element, is of nearly circular cross section, and to avoid cutting too far on the side of the tool or the side of the work piece only limited upper and lower portions of this nearly circular end of the work piece are finished in the operation so far described. To thus limit the finish at the end of the work piece referred to, means are provided on the master element, and I refer now to Figs. 19 and 20, wherein it will be seen that the fin 36 is cut off adjacent the circular portion and that an enlarging continuation thereof, 200, is provided.

One such enlarging continuation 200 is provided for each side of the master element and both are held removably in position by a pair of cooperating clamping elements 201 and 202, which may be secured to each other as by screws 203.

A V-shaped groove is preferably provided in the end of the member 200 at the point where it meets the fin 36 and a complementary V-shaped projection of the fin 36 engages therein to accurately locate the member 200 with respect to the fin and to support that end of the member 200. The V-shaped portion of the fin is cut back as shown in Fig. 19 and the member 200 is correspondingly formed to lock the member 200 against movement away from the master element 17.

After the blade has been finished in the manner heretofore described, the clamping members 201 and 202 and the elements 200 are removed from the master element 17, the master element and the work piece are disposed with the blades extending vertically, and the small V-shaped unfinished portions occurring at opposite sides of the somewhat circular end of the work piece are finished.

I refer now to Fig. 2 and particularly to the manner of supporting the work piece, the master element, and the means for preparing the master element, in the headstock of the machine. The propeller blade, both in the sample or model form designated by the numeral 24, and in the final production form, is provided with a necked out portion indicated at 205 and a split ring 206 is provided for encircling such necked portion. Prior to placement of the two halves of the split ring 206 in assembled position a threaded and flanged collar 207 is placed upon the propeller blade at its inner end and moved to a point past the necked out portion. The split ring 206 is then placed in position and the threaded and flanged element 207 is moved toward the end of the blade and threaded onto either of the enlarged portions 136 or 137 of the spindles 134 and 135, respectively.

The enlarged portions 136 and 137 of the spindles are spaced outwardly from the headstock housing 130. In the case of the lower spindle this space is normally occupied by the arm 171 which carries the intermediate supporting mechanism. The box 25, the sample or model propeller 24, and the plastic filling material associated therewith, are preferably assembled in position in the machine and this is accomplished by disposing the left hand end of the box in the space between the housing 130 and the enlarged portion 136 of the spindle. The removable portion 26 of the box end is then placed in assembled position on the box with the assembled box end encircling the spindle 134. The sample or model propeller blade is then assembled with the enlarged portion 136 by means of a split ring 206 and a collar 207 as in the case of the work piece 15.

When the master element 17 is disposed in the upper station of the machine the space between the housing 130 and the enlarged portion 136 of the spindle 134 may be taken up by a split collar 208, or the box 25 may be provided with an entirely removable left end element, which may be permitted to remain in position about the spindle 134 in such space whether or not the box 25 is in use.

For purposes of checking and determining the accuracy of the finished work piece a dial indicator, such as that illustrated in Fig. 13, may be employed. When this is done the pivotal portion 83 of the cutting head is removed and the body 211 of the dial indicator is substituted therefor, the indicator having a following tip 212 for bearing against the finished surface of the work piece and conventional magnifying mechanism for indicating on an enlarged scale on the dial 213 any deviations which may appear as between the master element 17 and the finished work piece.

Referring now to the form of transverse feeding mechanism illustrated in Figs. 21, 22 and 23, it may be stated generally that two modifications have been incorporated in the mechanism illustrated in those figures. These two modifications are to some extent independent and either of them may be substituted for the corresponding mechanism of the already described embodiment without necessarily using the other.

One of the two modifications resides in the fact that in the feeding mechanism of Fig. 21 the transverse feed screw is carried by the intermediate transverse slide while the mechanism for automatically or manually rotating the feed screw is carried by the carriage, the relative lateral movement between the feed screw and the means for rotating the feed screw, owing to relative lateral movement between the intermediate transverse slide and the carriage due to operation of the cam 52, being taken care of by a splined telescoping connection. The other modification referred to resides in the form of ratchet mechanism for imparting step by step movement to the feed screw and this mechanism is illustrated in detail in Figs. 22 and 23.

Referring to Fig. 21, the feed screw 215 is here set into the upper surface of an intermediate slide member 216 which otherwise corresponds to the slide 50 of Fig. 4. The opening provided in the upper surface of the slide 216 for reception of the screw 215 is preferably closed by a relatively thin cover member 217 for excluding chips and other foreign matter from the opening. Suitable bearings 218 and 219 for supporting the screw 215 may be integrally formed with the slide 216 and stop collars 220 and 221 preventing axial movement of the screw relative to the slide 216. A threaded sleeve 222 engages the threaded portion of the screw 215 and is provided with an upward extension 223 which engages an opening in an upper slide member 224, which upper slide member is otherwise similar to the slide member 61 of Fig. 4, the slide members 216 and 224 being joined by a transversely extending dovetailed joint for permitting relative sliding movement therebetween.

Means for rotating the screw 215 to effect feeding of the upper slide member 224, by movement of the sleeve 222 along the threaded portion of the screw, is supported on the carriage 225, otherwise similar to the carriage 43 of Fig. 4, and for this purpose there is provided a bearing 226 which supports a shaft 227. The inner end of the shaft 227 is splined and cooperates with a sleeve 228 fixedly carried by the screw 215 and which is correspondingly splined so that free axial movement may take place between the shaft 227 on the one hand, and the sleeve 228 and the screw 215 on the other hand, the while such parts are secured against relative rotative movement.

Referring now particularly to Figs. 22 and 23, the shaft 227 is provided outside the bearing block 226 with automatic means for causing step by step rotation thereof and its outer terminal portion is squared or flattened as at 230 to facilitate manual rotation of the feeding means by the use of a wrench or handle member not shown.

The automatic feeding mechanism comprises a pair of ratchet wheels 231 and 232, the former of which is fixed to the shaft 227 as by means of a key 233. A pinion 234 is fixed to the ratchet wheel 231 or to the shaft 227 for joint rotation therewith, and the ratchet 232 carries an internal gear 235. A stationary bearing 236 is supported by, and preferably formed integrally with, a sleeve 237 which extends through the ratchet wheel 232 and into the bearing block 226, wherein the sleeve 237 is clamped against rotary movement as by forming the bearing member 226 in halves for frictionally gripping the outside of the sleeve 237 or in any other convenient manner. The ratchet wheel 232 is mounted for free rotation upon the sleeve 237. The bearing 236 has journaled therein a pin 238 which has fixed thereto pinions 239 and 240, the former meshing with the pinion 234 and the latter in mesh with the internal gear 235.

The ratio existing between the pinion 234 and the pinion 239 is inversely proportional to the ratio existing between the pinion 240 and the internal gear 235. From this it will appear that any rotation of the ratchet wheel 231 will be accompanied by an exactly equal and opposite rotation of the ratchet wheel 232 and vice versa, and the direction of rotation of the shaft 227 will be determined by and be the same as the direction of rotation of the ratchet wheel 231. A lever 243 is mounted for free pivotal movement on the shaft 227 and carries at its upper end a pivot means 244 for supporting a pair of pawls 245 and 246 for engaging with the ratchet wheels 231 and 232 respectively.

The ratchet wheels 231 and 232 have substantially square teeth and the pawls have ratchet engaging portions which extend in opposite directions from their terminal portions, whereby they may be lifted from engagement with the ratchet and pivotally moved to a position where they engage with the ratchet wheel on the opposite side of the pivot point. This pawl and ratchet construction is conventionally employed where it is desired to selectively reverse the direction in which a ratchet is driven by a pawl.

The lever 243 has a depending portion 248 which is so disposed as to be in line with a pair of adjustable stop members 249 and 250 carried by the bed 10 of the machine. A cam plate 251 may, if desired, be positioned upon the sleeve 237 and is shown as being secured against movement by clamping means 252 which engage a projection 253 on the bearing block 226. The cam plate 251 has circumferentially adjustable raised portions 255 and 256. When the angular movement of the lever 243 with the pawls 245 and 246 exceeds a pre-determined amount one of the rollers 257 and 258 with which the pawls 245 and 246 are respectively provided will engage a raised cam portion 255 or 256 and lift the pawl from engagement with its respective ratchet wheel.

The automatic feeding mechanism of Figs. 21, 22 and 23 will therefore operate in the following manner. With the parts in the position shown in Fig. 22 the carriage of the machine is moving from left to right as seen in that figure, and as it approaches its right hand limit of movement the lower extension 248 of the lever 243 comes into engagement with the stop member 250 and is given a clockwise rotation of pre-determined degree. This movement, through the medium of the pawl 245 and the ratchet wheel 231, imparts a like movement to the shaft 227. During this movement the cam face of the pawl 246 causes the pawl 246 to ride out of engagement and across the teeth of the ratchet 232.

After the carriage 225 with the instrumentalities carried thereby has reversed its direction of movement and as it approaches its left hand limit of movement, the portion 248 of the lever 243 comes into engagement with the stop member shown in dotted lines 249 and the lever 243 is given a counter-clockwise movement equal in degree to the previous clockwise impulse. During this counter-clockwise movement the pawl 245 rides out of engagement with the ratchet 231 and the pawl 246 has driving engagement with the ratchet wheel 232, imparting a counter-clockwise rotation thereto. From the previously described relationship between the ratchet wheels 231 and 232, as a result of the employment of the gear train 234, 239, 240 and 235, the counter-clockwise rotation of the idle ratchet wheel 232 is translated into an equal but opposite, that is, clockwise, rotation of the ratchet wheel 231 which is fixed to the shaft 227, and a further clockwise rotation of the shaft 227 will result.

When it is desired to reverse the transverse automatic feed of the slide 224, that is to impart to the screw 215 a step by step counter-clockwise rotation, the pawl 245 is lifted from engagement with the ratchet wheel 231, as shown in Fig. 22, and is placed in engagement with that ratchet on the opposite side of the pivot 244, that is, it occupies approximately the position shown in Fig. 4 as being occupied by the pawl 246. The pawl 246 is likewise reversed by movement about the pivot 244 so that it occupies the position formerly occupied by the pawl 245. In this way successive pivotal actuations of the lever 243 in opposite directions are caused to result in a step by step counter-clockwise rotation of the screw 215.

The ratchet mechanism just described may, if desired, be modified by providing the ratchet wheels 231 and 232 with conventional uni-directional teeth and pawls which operate in a constant direction with respect to the ratchet wheel. In this case the teeth of the ratchet wheel 231 will be disposed oppositely from the teeth of the ratchet wheel 232. If it be desired to use such ratchets it is necessary to provide clutching means for selectively clutching either the ratchet wheel 231 or the ratchet wheel 232 to the shaft 227.

While specific embodiments of the machine have been shown, it will be seen that such modifications may be made as appear desirable without departing from the spirit of the invention as defined in the appended claims. If it is desired to finish simultaneously the two opposed blades of a propeller, whether or not they are in one piece, all of the mechanism appearing to the right of the headstock 14 in Fig. 1 may be duplicated reversely to the left thereof with such suitable modification of the headstock as may be necessary to properly support the central portion of a one-piece propeller. Also the work piece station and the cooperating instrumentalities therefor may be repeated either adjacent the single work piece station shown in Fig. 1 or above the master element whereby two or more blades may be finished simultaneously and from a single master element.

I claim:

1. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced work supporting elements for effecting cutting strokes, means for automatically varying the disposition of said cutting means in a direction at right angles to a plane extending through the work piece and the control element during longitudinal cutting strokes, and means for synchronously rotating the work piece and said control element about parallel longitudinal axes.

2. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element, and means associated with said last mentioned means and said cutting means for varying the vertical and horizontal transverse disposition of said cutting means during longitudinal cutting strokes.

3. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element, means associated with said last mentioned means for varying the vertical disposition of said cutting means during longitudinal cutting strokes, and means for automatically varying the lateral disposition of said cutting means during longitudinal cutting strokes.

4. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element, means associated with said last mentioned means and said cutting means for varying the vertical disposition of said cutting means during longitudinal cutting strokes, means for varying the lateral disposition of said cutting means during longitudinal cutting strokes, and means for synchronously rotating said control element and the work piece about parallel longitudinal axes.

5. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for automatically varying the disposition of said cutting means in a direction at right angles to a plane extending through the work piece and the control element during longitudinal cutting strokes, and means for synchronously rotating the work piece and said control element about parallel longitudinal axes.

6. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element for varying the vertical disposition of said cutting means during longitudinal cutting strokes, means for automatically varying the lateral disposition of said cutting means during longitudinal cutting strokes, and means for automatically moving said cutting means laterally between successive cutting strokes.

7. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for automatically varying the lateral disposition of said cutting means during longitudinal cutting strokes, and means for automatically moving said cutting means laterally between successive cutting strokes.

8. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element, means associated with said last mentioned means and said cutting means for varying the vertical and horizontal transverse disposition of said cutting means during longitudinal cutting strokes, and means for automatically moving said cutting means transversely between successive cutting strokes.

9. In a machine tool for reproducing and finishing compound curved surfaces of airplane propeller blades and the like by means of a master control element, means for supporting a work piece and means for supporting a control element, cutting means reciprocable longitudinally for effecting cutting strokes, means reciprocable with said cutting means and engageable with said control element for varying the vertical disposition of said cutting means during longitudinal cutting strokes, means for varying the lateral disposition of said cutting means during longitudinal cutting strokes, means for automatically moving said cutting means transversely between successive cutting strokes, and means for synchronously rotating said control element and the work piece about parallel longitudinal axes.

10. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for automatically varying the lateral disposition of said cutting means during longitudinal cutting strokes, means for moving said cutting means laterally between successive cutting strokes, and means for synchronously rotating the work piece and said control element about parallel longitudinal axes.

11. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means reciprocable with said cutting means and engageable with said control element for varying the vertical disposition of said cutting means during longitudinal cutting strokes, means for automatically varying the lateral disposition of said cutting means during longitudinal cutting strokes, and means for automatically moving said cutting means laterally between successive cutting strokes.

12. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means for automatically varying the lateral disposition of said cutting means during longitudinal cutting strokes, and means for automatically moving said cutting means laterally between successive cutting strokes.

13. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means reciprocable with said cutting means and engageable with said control element, means associated with said last mentioned means and said cutting means for varying the vertical and horizontal transverse disposition of said cutting means during longitudinal cutting strokes, and means for automatically moving said cutting means transversely between successive cutting strokes.

14. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means reciprocable with said cutting means and engageable with said control element for varying the vertical disposition of said cutting means during longitudinal cutting strokes, means for varying the lateral disposition of said cutting means during longitudinal cutting strokes, means for automatically moving said cutting means transversely between successive cutting strokes, and means for synchronously rotating said control element and the work piece about parallel longitudinal axes.

15. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally for effecting cutting strokes, means for automatically varying the lateral disposition of said cutting means during longitudinal cutting strokes, means for moving said cutting means laterally between successive cutting strokes, and means for synchronously rotating the work piece and said control element about parallel longitudinal axes.

16. In a machine tool for reproducing and finishing compound curved surfaces of airplane propeller blades and the like by means of a master control element, a pair of spaced work supporting element, means on each of said elements for cooperation to support a work piece, other means on each of said elements for cooperation to support a control element in spaced parallel relationship to said work piece, cutting means reciprocable in a path parallel to said work piece and said control element and a cutting tool thereon for effecting cutting strokes, and means associated with said cutting means and engageable with said control element for controlling the transverse disposition of said tool with respect to said work piece in a direction at right angles to a plane extending through the work piece and the control element.

17. In a machine tool for reproducing and finishing compound curved surfaces of airplane propeller blades and the like by means of a master control element, a pair of spaced work supporting elements, means on each of said elements for cooperation to support a work piece, other means on each of said elements for cooperation to support a control element in spaced parallel relationship to said work piece, a cutting tool, a cutting tool support reciprocable in a path parallel to said work piece and said control element to reciprocate said cutting tool for effecting cutting strokes, and means associated with said cutting means and engageable with said control element for progressively varying the transverse disposition of said cutting tool with respect to said cutting tool support between successive cutting strokes.

18. In a machine tool for reproducing and finishing compound curved surfaces of airplane propeller blades and the like by means of a master control element, a pair of spaced work supporting elements, means on each of said elements for cooperation to support a work piece, other means on each of said elements for cooperation to support a control element in spaced parallel relationship to said work piece, a cutting tool, a cutting tool support reciprocable in a path parallel to said work piece and said control element to reciprocate said cutting tool for effecting cutting strokes, means associated with said cutting means and engageable with said control element for progressively varying the transverse disposition of said cutting tool with respect to said cutting tool support between successive cutting strokes, and means associated with one of said supporting elements for synchronously rotating said work piece and said control element.

19. In a machine tool for reproducing and finishing compound curved surfaces of airplane propeller blades and the like by means of a master control element, a pair of spaced work supporting elements, means on each of said elements for cooperation to support a work piece, other means on each of said elements for cooperation to support a control element, a cutting tool, a cutting tool support reciprocable in a path parallel to said work piece and said control element to reciprocate said cutting tool for effecting cutting strokes, means associated with said cutting tool and said cutting tool support for varying the transverse disposition of said cutting tool during cutting strokes, and other means for automatically moving said cutting tool transversely between successive cutting strokes.

20. In a machine tool for reproducing and finishing compound curved surfaces of airplane propeller blades and the like by means of a master control element, a pair of spaced work supporting elements, means on each of said elements for cooperation to supoprt a work piece, other means on each of said elements for cooperation to support a control element, a cutting tool, a cutting tool support reciprocable in a path parallel to said work piece and said control element to reciprocate said cutting tool for effecting cutting strokes, means associated with said cutting tool and said cutting tool support for varying the transverse disposition of said cutting tool during cutting strokes, other means for automatically moving said cutting tool transversely between successive cutting strokes, and means associated with one of said supporting elements for synchronously rotating said work piece and said control element.

21. In a machine tool for reproducing and finishing compound curved surfaces of airplane propeller blades and the like by means of a master control element, means for supporting a work piece and means for supporting a control element, a cutting tool, a support therefor comprising means reciprocable in a path parallel to said work piece and said control element for effecting cutting strokes, means movably mounted upon said support for transverse sliding movement, means acting between said support and said transversely slidable means for moving said last mentioned means transversely in a predetermined path during cutting strokes, and means acting between said control element and said cutting tool for controlling the vertical disposition of said cutting tool during cutting strokes.

22. In a machine tool, means for supporting a work piece, a cutting tool, a support therefore comprising means reciprocable in a path parallel to said work piece for effecting cutting strokes, means on said support mounted for transverse sliding movement, and control means thereof acting between said support and said transversely sliding means for causing predetermined transverse sliding movement of the latter during cutting strokes.

23. In a machine for reproducing curved surfaces, means for supporting a work piece, a cutting tool and a support therefor comprising means reciprocable in a direction parallel to said work piece for effecting cutting strokes, means thereon adapted for transverse sliding movement with respect to said support, means for defining transverse movement thereof during cutting strokes, other means on said transversely sliding means and mounted for transverse sliding movement with respect to said transversely sliding means, and means acting between said two elements for effecting relative transverse movement therebetween between successive cutting strokes.

24. In a machine for reproducing curved surfaces, means for supporting a work piece and means for supporting a control element, a cutting tool and a support therefore comprising means reciprocable in a direction parallel to said work piece and said control element, means thereon adapted for transverse sliding movement with respect to said support, means for defining transverse movement thereof during cutting strokes, other means on said transversely sliding means, such means being mounted for transverse sliding movement with respect to said transversely sliding means, means acting between said two elements for effecting relative transverse movement therebetween between successive cutting strokes, and means acting between said control element and said cutting tool for controlling the vertical disposition of said cutting tool during cutting strokes.

25. In a machine tool, means for supporting a work piece, a cutting tool, a support therefor comprising means reciprocable in a path parallel to said work piece for effecting cutting strokes, means on said support mounted for transverse sliding movement and control means therefor acting between said support and said transversely sliding means for causing predetermined transverse sliding movement of the latter during cutting strokes, other means carried by said transversely sliding means and transversely slidable with respect thereto, and means acting between said transversely sliding means and said other means for effecting relative transverse movement therebetween between successive cutting strokes.

26. In a machine tool, means for supporting a work piece, a cutting tool, a support therefor comprising means reciprocable in a path parallel to said work piece for effecting cutting strokes, a pair of slide members on said support and transversely slidable with respect to said support and with respect to each other, one of said slide members being carried by the other, means acting between a slide mamber and said support for effecting sliding movement of the slide member to effect transverse movement of the cutting tool during cutting strokes, and means for causing transverse sliding movement of the other slide member for effecting transverse movement of the cutting tool between cutting strokes.

27. In a machine tool, means for supporting a work piece, a cutting tool, a support therefor comprising means reciprocable in a path parallel to said work piece for effecting cutting strokes, a slide member disposed on said support for transverse sliding movement and carrying said cutting tool, a cam on one of the two last-mentioned means and a cam follower therefor on the other of said means, said cam being actuable by reciprocation of said support for effecting an accompanying transverse movement of said cutting tool during reciprocation of said support.

28. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for automatically varying the lateral disposition of said cutting means during longitudinal cutting strokes, means for moving said cutting means laterally between successive cutting strokes, and means operative between successive cutting strokes for synchronously rotating the work piece and said control element about parallel longitudinal axes in a step by step movement between cutting strokes.

29. In a machine tool, means for supporting a work piece, cutting means and a support therefor reciprocable longitudinally for effecting cutting strokes in each direction, means for varying the lateral disposition of said cutting means during longitudinal cutting strokes, means for automatically moving said cutting means transversely between successive cutting strokes, said last mentioned means comprising a screw engageable between said cutting means and said support for varying their relative lateral disposition upon rotation of the screw, and means for automatically imparting rotative movement to said screw between cutting strokes comprising ratchet mechanism including a ratchet lever adapted to be moved in opposite directions at the ends of strokes in opposite directions, and a pair of ratchet wheels arranged for rotary driving movements in directions opposite to each other, said lever acting upon one of said ratchet wheels at the end of a stroke in one direction and on the other ratchet wheel at the end of a stroke in the opposite direction, said two ratchet wheels being related to said screw in such manner that driving rotation of either effects rotation of said screw in the same direction.

30. In a machine tool, means for supporting a work piece, cutting means and a support therefor reciprocable longitudinally for effecting cutting strokes in each direction, means for varying the lateral disposition of said cutting means during longitudinal cutting strokes, means for automatically moving said cutting means transversely between successive cutting strokes, said last mentioned means comprising a screw engageable between said cutting means and said support for varying their relative lateral disposition upon rotation of the screw, and means for automatically imparting rotative movement to said screw between cutting strokes comprising ratchet mechanism including a ratchet lever adapted to be moved in opposite directions at the ends of strokes in opposite directions, a pair of ratchet wheels arranged for rotary driving movements in directions opposite to each other said lever acting upon one of said ratchet wheels at the end of a stroke in one direction and on the other ratchet wheel at the end of a stroke in the opposite direction, said two ratchet wheels being related to said screw in such manner that driving rotation of either effects rotation of said screw in the same direction, and means associated with said ratchet mechanism for selectively effecting reversal of the uni-directional rotations imparted thereby to said screw.

31. In a machine tool for reproducing compound curved surfaces of airplane propeller blades and the like by means of a control element, work supporting means comprising spaced elements each adapted to engage and support one end of a work piece and a corresponding end of a control element, cutting means reciprocable longitudinally between said spaced supporting elements for effecting cutting strokes, means reciprocable with said cutting means and engageable with said control element for varying the transverse disposition of said cutting means during longitudinal cutting strokes, means associated with one of said work supporting elements for rotating said work piece about a longitudinal axis, and intermediate work supporting means comprising a bar having adjustable work piece engaging elements carried thereby, supporting means for said bar fixed to said work supporting means and arranged for coaxial rotation with said work piece whereby constant relationship between the work piece and the intermediate supporting means is maintained during rotation of said work piece.

32. In a machine tool for producing compound curved surfaces of airplane propeller blades and the like, work supporting means comprising spaced elements adapted to engage and support opposite ends of a work piece, cutting means reciprocable longitudinally between said spaced supporting elements for effecting cutting strokes, means associated with one of said work supporting elements for rotating said work piece about a longitudinal axis, and means for giving support to said work piece intermediately of said spaced elements comprising adjustable work engaging elements suspended from said spaced elements and rigidly mounted for coaxial rotation with said work piece whereby supporting engagement between said intermediate supporting means and the work piece is maintained throughout rotation of the latter.

33. In a machine tool for reproducing compound curved surfaces of airplane propeller blades by means of a control element, work supporting means comprising spaced elements each adapted to engage and support one end of a work piece and a corresponding end of a control element, cutting means reciprocable longitudinally between said spaced supporting elements for effecting cutting strokes, means for automatically varying the lateral disposition of said cutting means during longitudinal cutting strokes, said spaced work supporting elements being adjustable toward and away from each other for accommodating work pieces and control elements of varying length and for bringing the supporting elements into supporting engagement with the work piece and the control element.

34. In a machine for reproducing and finishing compound surfaces of airplane propeller blades and the like by means of a master control element, a pair of spaced work supporting elements, means on each of said elements for cooperation to support a work piece, other means on each of said elements for cooperation to support a control element, a cutting tool, a cutting tool support reciprocable in a path parallel to said work piece and said control element to reciprocate said cutting tool for effecting cutting strokes, means associated with said cutting tool and said cutting tool support for varying the vertical transverse disposition of said cutting tool during cutting strokes, and other means for automatically moving said cutting tool laterally between successive cutting strokes.

35. In a machine for reproducing and finishing compound surfaces of airplane propeller blades and the like by means of a master control element, a pair of spaced work supporting elements, means on each of said elements for cooperation to support a work piece, other means on each of said elements for cooperation to support a control element, a cutting tool, a cutting tool support reciprocable in a path parallel to said work piece and said control element to reciprocate said cutting tool for effecting cutting strokes, means associated with said cutting tool and said cutting tool support for varying the vertical transverse disposition of said cutting tool during cutting strokes, other means for automatically moving said cutting tool laterally between successive cutting strokes, and means for synchronously rotating said work piece and said control element.

WILLIAM H. FORD.